United States Patent
Watanabe et al.

(10) Patent No.: US 7,297,440 B2
(45) Date of Patent: Nov. 20, 2007

(54) BATTERY PACK AND PROCESS FOR THE PRODUCTION THEREOF

(75) Inventors: Atsushi Watanabe, Tsuna-gun (JP); Hirotaka Shinya, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 666 days.

(21) Appl. No.: 10/695,391

(22) Filed: Oct. 29, 2003

(65) Prior Publication Data
US 2004/0241541 A1 Dec. 2, 2004

(30) Foreign Application Priority Data
Oct. 31, 2002 (JP) ............................. 2002-317689

(51) Int. Cl.
*H01M 2/00* (2006.01)
*H01M 2/02* (2006.01)
*H01M 2/08* (2006.01)

(52) U.S. Cl. .................. 429/163; 429/167; 429/175

(58) Field of Classification Search ................ 429/167, 429/138, 135, 174, 172, 163, 184, 171
See application file for complete search history.

(56) References Cited

U.S. PATENT DOCUMENTS

| | | | | |
|---|---|---|---|---|
| 4,388,865 A | * | 6/1983 | Kellner | 101/401.1 |
| 6,255,433 B1 | * | 7/2001 | Kuroda et al. | 528/49 |
| 6,632,538 B1 | * | 10/2003 | Yamazaki et al. | 428/461 |
| 2003/0108786 A1 | * | 6/2003 | Aaltonen et al. | 429/61 |

FOREIGN PATENT DOCUMENTS

| | | |
|---|---|---|
| JP | 38-15713 | 8/1966 |
| JP | 42-19477 | 11/1967 |
| JP | 49-9345 | 3/1974 |
| JP | 5-39340 | 2/1993 |
| JP | 6-31067 | 4/1994 |
| JP | 6-228498 | 8/1994 |
| JP | 8-185843 | 7/1996 |
| JP | 9-63552 | 3/1997 |
| JP | 10-021887 | 1/1998 |
| JP | 2000-315483 | 11/2000 |
| JP | 2001-43893 | 2/2001 |
| JP | 2002-208767 | 7/2002 |
| JP | 2002-231192 | 8/2002 |

* cited by examiner

*Primary Examiner*—Patrick Joseph Ryan
*Assistant Examiner*—Ben Lewis
(74) *Attorney, Agent, or Firm*—Wenderoth, Lind & Ponack, L.L.P.

(57) ABSTRACT

A battery pack including a plastic protective layer bonded to the surface of a cell by spreading over the surface of the cell a polyurethane emulsion having a reaction product obtained by emulsifying and dispersing an intermediate product produced from a compound A made of an organic diisocyanate, a compound B1 made of a polyol mixture having not smaller than at least 2.05 average functional groups and a compound B2 having one hydrophilic center and at least two active hydrogen groups in water.

14 Claims, 7 Drawing Sheets

BATTERY PACK AND PROCESS FOR THE PRODUCTION THEREOF

This application is based on applications No.2002-317689 filed in Japan on Oct. 31, 2002, the content of which is incorporated hereinto by reference.

BACKGROUND OF THE INVENTION

1. Technical Field

The present invention relates to a battery pack and a process for the production thereof.

2. Description of the Related Art

The related art battery pack is arranged such that an elementary battery cell is received in an outer case. The outer case insulates and protects the metal case of the cell. This battery pack is prepared by receiving an elementary battery cell in an outer case prepared by molding a plastic. This structure requires many producing steps that add to the production cost. In recent years, a production method has been developed which comprises inserting a cell in an outer case at a step of forming an outer case. This battery pack is disclosed in Patent Reference JP-A-2000-315483, the content of which is incorporated herein by reference. This battery pack is prepared by temporarily fixing a battery core pack having a holder and a cell connected to each other in a mold for forming a molded resin product which is an outer case, and then inserting and fixing the core pack in the outer case thus formed. In order to prepare this battery pack, it is not necessary that the core pack be received in a separately formed outer case during assembly. Therefore, this battery pack can be mass-produced efficiently.

However, this battery pack is disadvantageous in that the actual production thereof adds to production cost, it takes much time to accurately fix the battery core pack temporarily in the predetermined position and the production yield is reduced. The reason why the production cost rises is that a complicated mold allowing easy release of the outer case thus formed and a mechanism for driving this mold are required in addition to the necessity of accurately fixing the core pack temporarily in the predetermined position in such a manner that the core pack is not moved. Further, the reason why it takes much time to temporarily fix the core pack is that the core pack must be certainly attached to the open mold at a predetermined position. Moreover, the reason why the production yield is reduced is that the plastic to be molded into the outer case penetrates unnecessary portions under injection pressure or the molten plastic cannot be accurately injected into desired portions. Further, the method which comprises inserting the battery core pack partly in the mold at the step of forming the outer case to produce a battery pack is disadvantageous in that it is difficult to cover the surface of the cell by the outer case. In particular, it is extremely difficult to cover the surface of the cell by a thin outer case. This is because the thickness of the cell has an error that differs from position to position. For example, a thin battery cannot have a completely flat surface on the-both sides. For example, a thin battery which is bent such that it protrudes at the center thereof is thicker at the center thereof than at the edge thereof. When a molten plastic is then injected into the mold for forming the outer case for covering both sides of the battery with such a cell temporarily fixed in the forming chamber of the mold, the resulting outer case is thinner at the position corresponding to the thick portion of the thin battery or the surface of the thin battery is partly exposed to the exterior of the outer case, producing defectives. It may be thought likely that this trouble can be eliminated by forming a thicker outer case for covering both sides of the thin battery. However, it is actually not possible to form a thicker outer case. This is because the thicker the outer case is, the thicker is the entire battery pack. The production of thin batteries requires an extreme technique for raising the charge capacity while minimizing the external size. The cell thus produced should not be received in a thick outer case to form a battery pack having a large external size. Therefore, in the battery pack produced by inserting a battery core pack in an outer case, the thin battery is not insulated by the outer case on both sides thereof. A label is bonded to the both sides of the cell so that the cell is insulated. The bonding of such a label requires the cost of the label and the cost of bonding the label, adding to the production cost.

The invention has been worked out for the purpose of eliminating these disadvantages of the related art battery pack. An important object of the invention is to provide a battery pack which can be mass-produced efficiently in a high yield at a reduced cost using a simple producing apparatus and a process for the production thereof.

Another important object of the invention is to provide a battery pack which can be covered and insulated on both sides thereof by a thin plastic protective layer having a uniform thickness even if the external size of the cell has an error.

The above and further objects and features of the invention will more fully be apparent from the following detailed description with accompanying drawings.

SUMMARY OF THE INVENTION

The battery pack of the invention comprises a plastic protective layer bonded to the surface of a cell. This plastic protective layer is provided by curing a polyurethane emulsion spread over the surface of the cell. This polyurethane emulsion comprises a reaction product obtained by emulsifying and dispersing an intermediate product produced from a compound A made of an organic diisocyanate, a compound B1 made of a polyol mixture having not smaller than at least 2.05 functional groups on the average and a compound B2 having one hydrophilic center and at least two active hydrogen groups in water.

In the battery pack of the invention, a holder having an output terminal attached thereto at a predetermined position can be fixed to the end of the cell. In this battery pack, with the periphery of the holder following the periphery of the cell, the polyurethane emulsion is spread over the area extending from the periphery of the cell to the periphery of the holder so that a plastic protective layer is bonded to the periphery of the cell and the holder and the holder and the cell are connected to each other at their border with the plastic protective layer. The holder can be bonded and fixed to the cell. The holder may be also fixed to the cell with a rivet. A protective element may be provided so as to be interposed between the holder and the cell.

The compound B1, which is a polyol mixture the average number of functional groups of which is not smaller than 2.05, can be produced from a polyol mixture of a bifunctional polyol and a trifunctional or higher polyol. The compound B1 preferably is a polyol mixture of a bifunctional polyol and a trifunctional polyol the average number of functional groups of which is from 2.05 to 2.6. The compound B1 is more preferably arranged such that the molecular weight of the trifunctional polyol is smaller than the molecular weight of the bifunctional polyol.

The polyurethane emulsion may comprise a pigment incorporated therein. This pigment may be a carbon black. Further, the battery pack of the invention allows the polyurethane emulsion having a carbon black incorporated therein to be irradiated with a laser beam so that the carbon black undergoes sublimation and discoloration to effect display of letters, patterns, signs, etc. Moreover, the battery pack of the invention may a thixotropic material incorporated in the polyurethane emulsion.

The process for the production of a battery pack of the invention comprises spreading a polyurethane emulsion comprising a reaction product obtained by emulsifying and dispersing an intermediate product produced from a compound A made of an organic diisocyanate, a compound B1 made of a polyol mixture having not smaller than at least 2.05 average functional groups and a compound B2 having one hydrophilic center and at least two active hydrogen groups in water over the surface of a cell, and then curing the polyurethane emulsion thus spread to coat the surface of the cell with the plastic protective layer.

In the process for the production of a battery pack of the invention, the cell can be dipped in the polyurethane emulsion to coat the surface of the cell with the polyurethane emulsion. Further, in the process for the production of a battery pack of the invention, the polyurethane emulsion can be spread over the surface of the cell using a roller.

Moreover, the process for the production of a battery pack of the invention comprises attaching to the end of the cell a holder having an output terminal attached thereto at a predetermined position and the periphery of which follows the periphery of the cell, and then spreading a polyurethane emulsion over the area extending from the periphery of the cell to the periphery of the holder so that a plastic protective layer is bonded to the periphery of the cell and the holder and the holder and the cell are connected to each other at their border with the plastic protective layer.

The battery pack described above is advantageous in that a high quality battery pack can be efficiently mass-produced at a reduced cost in a high yield using a simple production apparatus. This is because a one-pack type polyurethane emulsion showing unique physical properties is spread over the surface of the cell to provide a plastic protective layer. The polyurethane emulsion which is spread over the surface of the cell to form a plastic protective layer comprises a reaction product obtained by emulsifying and dispersing an intermediate product produced from a compound A made of an organic diisocyanate, a compound B1 made of a polyol mixture having not smaller than at least 2.05 functional groups on the average and a compound B2 having one hydrophilic center and at least two active hydrogen groups in water. The plastic protective layer made of a polyurethane emulsion is formed by spreading the polyurethane emulsion over the surface of the cell and curing the polyurethane emulsion. In this manner, the plastic protective layer is bonded to the surface of the cell so firmly that it cannot be peeled off the surface of the cell, thereby covering and protecting the surface of the cell. Further, this plastic protective layer forms an extremely tough film that protects the cell. Therefore, the battery pack having this structure can be efficiently mass-produced using a simple apparatus for spreading the polyurethane emulsion over the surface of the cell without using a complicated mold or other apparatus as with the related art packed batteries which are produced by inserting the cell partly in an outer case. Further, since the plastic protective layer formed by spreading and curing a polyurethane emulsion acts as an outer case which protects the cell, it is not necessary that the cell be received in a separately molded plastic case as in the related art packed batteries. Accordingly, the battery pack described above is advantageous in that it can be simply and easily mass-produced at a reduced cost while protecting securely the surface of the cell by the plastic protective layer.

The battery pack described above is further advantageous in that even when the outer shape of the cell has an error, the surface of the cell can be coated and insulated with a thin plastic protective layer to a uniform thickness. This is because a polyurethane emulsion is spread over the surface of the cell and cured so that a plastic protective layer is bonded to the surface of the cell. In order to provide this plastic protective layer in this arrangement, the cell can be dipped in the polyurethane emulsion or coated with the polyurethane emulsion in such a manner that a layer is formed to a uniform thickness. In this manner, the plastic protective layer forms a tough film that is bonded to the surface of the cell so firmly that it cannot be peeled of f the surface of the cell, making it possible to insulate certainly the surface of the cell with a tough insulating film.

Moreover, the process for the production of a battery pack of the invention comprises a core pack assembly step of attaching to the end of the cell a holder having an output terminal attached thereto at a predetermined position and the periphery of which follows the periphery of the cell to form a battery core pack and a step of applying a stress to an adhesive solution comprising a thixotropic material incorporated therein to form a liquid adhesive and dipping at least a part of the holder and the cell in the liquid adhesive to spread the adhesive solution over the area extending from the periphery of the cell to the periphery of the holder so that the surface of the cell is coated with a plastic protective layer formed by curing the adhesive solution and the holder is connected to the cell with the plastic protective layer.

The adhesive solution may be a polyurethane-based adhesive, acrylic adhesive, epoxy-based adhesive or silicon-based adhesive. Further, the adhesive solution may be a polyurethane emulsion comprising a reaction product obtained by emulsifying and dispersing an intermediate product produced from a compound A made of an organic diisocyanate, a compound B1 made of a polyol mixture having not smaller than at least 2.05 functional groups on the average and a compound B2 having one hydrophilic center and at least two active hydrogen groups in water.

The process for the production of a battery pack described above is advantageous in that a battery pack can be efficiently mass-produced at a reduced cost in a high yield using a simple production apparatus and even when the outer shape of the cell has an error, the surface of the cell can be coated and insulated with a thin plastic protective layer to a uniform thickness. This is because this process comprises applying a stress to an adhesive solution comprising a thixotropic material incorporated therein to form a liquid adhesive and dipping at least a part of the holder and the cell in the liquid adhesive to spread the adhesive solution over the area extending from the periphery of the cell to the periphery of the holder so that the surface of the cell is coated with a plastic protective layer formed by curing the adhesive solution and the holder is connected to the cell with the plastic protective layer.

DETAILED DESCRIPTION OF THE PREFERRED EMBODIMENTS

Figure 1:
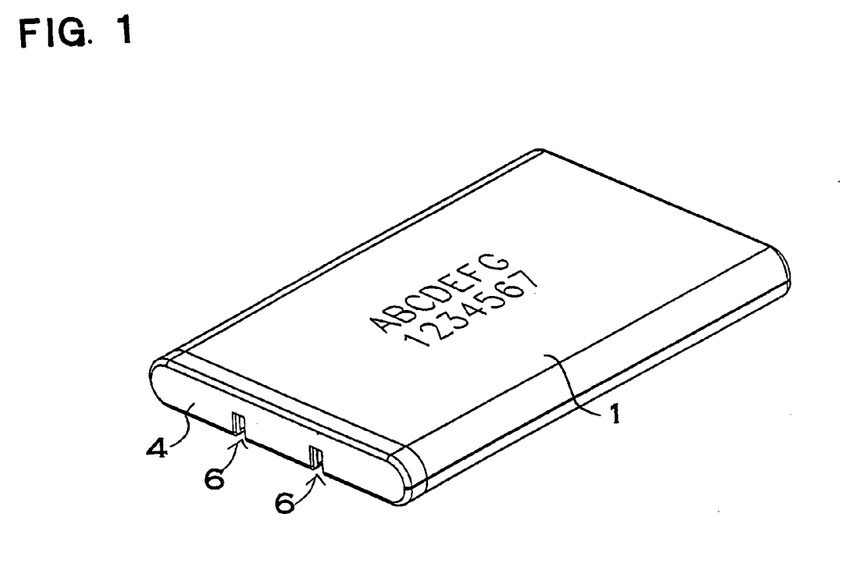
FIG. 1 is a perspective view of a battery pack according to an embodiment of the invention.
Figure 2:
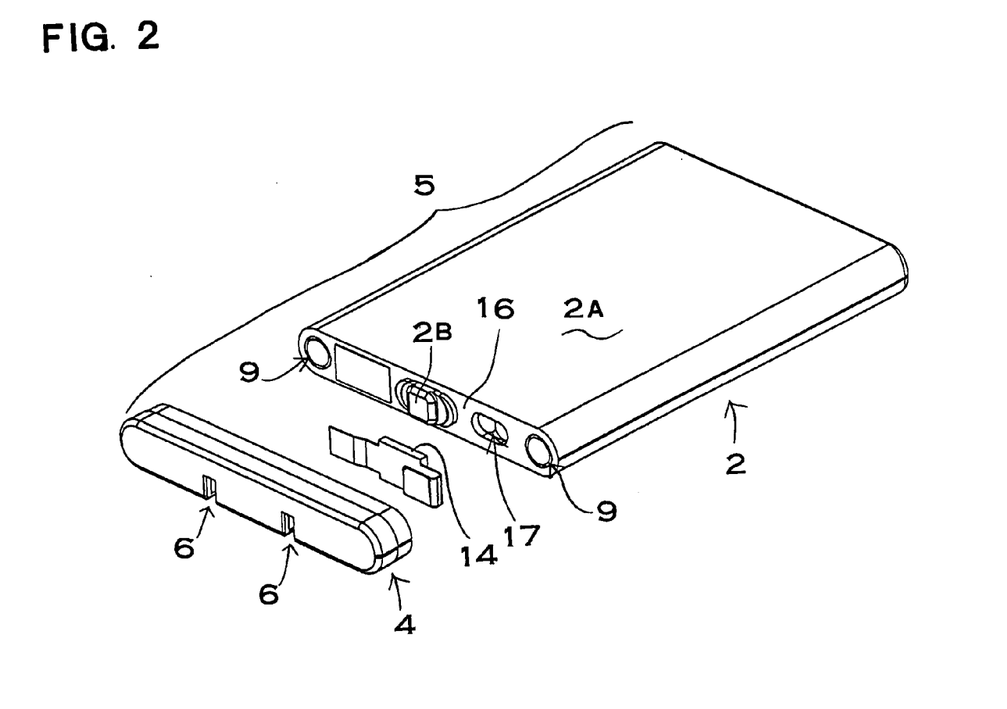
FIG. 2 is an exploded perspective view of a core pack of the battery pack shown in FIG. 1.
Figure 3:
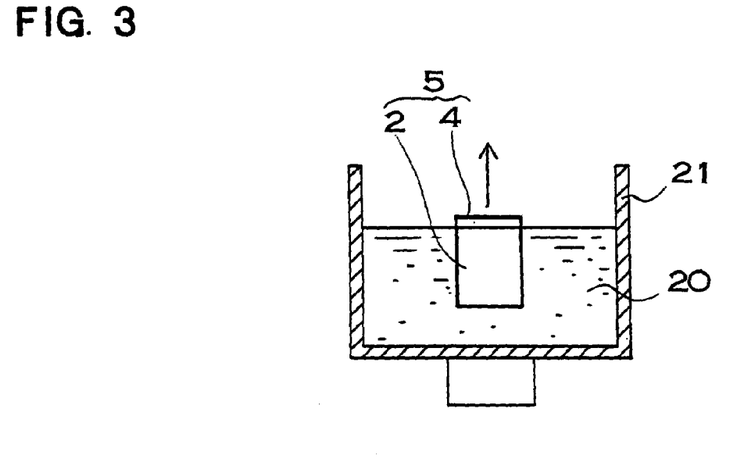
FIG. 3 is a sectional view illustrating how the core pack of a battery is dipped in an adhesive solution.

The battery pack shown in the perspective view of FIG. 1 and the exploded perspective view of FIG. 2 comprises a holder 4 having an output terminal 3 fixed to a cell 2 at the end thereof having a protruding electrode portion 2B. Referring to this battery pack, a core pack 5 comprising the holder 4 attached to the cell 2 is dipped in an adhesive solution 20 so that the cell 2 and the holder 4 are coated with the adhesive solution 20. The adhesive solution 20 is then cured to form a plastic protective layer 1 which covers the surface of the cell 2. The core pack 5 of the battery is dipped upright in the adhesive solution 20 with the cell 2 disposed down and the holder 4 disposed upside as shown in FIG. 3 so that the surface of the cell 2 and the holder 4 are coated with the adhesive solution 20. The cell 2 is coated with the adhesive solution 20 on the entire surface thereof exposed on the surface of the battery pack. In the case of the battery pack shown, the cell 2 is coated with the adhesive solution 20 on the periphery and the lower surface thereof. The holder 4 is coated with the adhesive solution 20 on the periphery thereof. Since the battery pack shown has terminal windows 6 provided on the side of the holder 4, the adhesive solution 20 is spread over the cell so that the adhesive solution 20 doesn't close the terminal windows 6.

Figure 4:
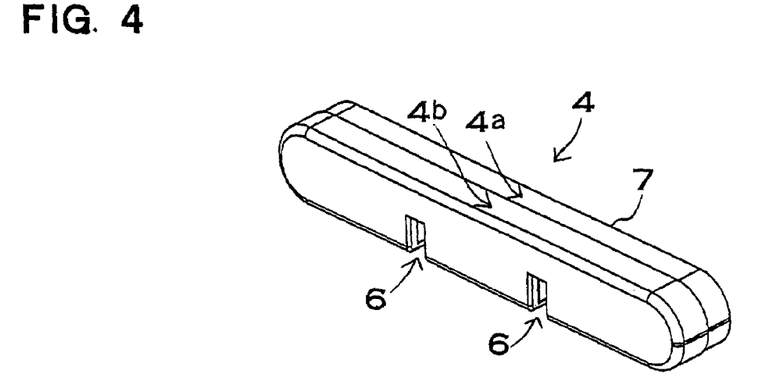
FIG. 4 is an enlarged perspective view of a holder.
Figure 5:
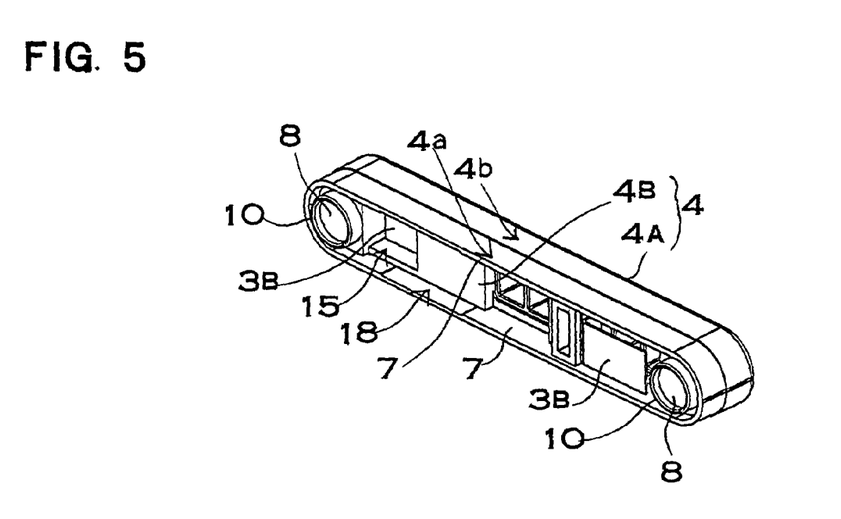
FIG. 5 is a rear perspective view of the holder shown in FIG. 4.
Figure 6:
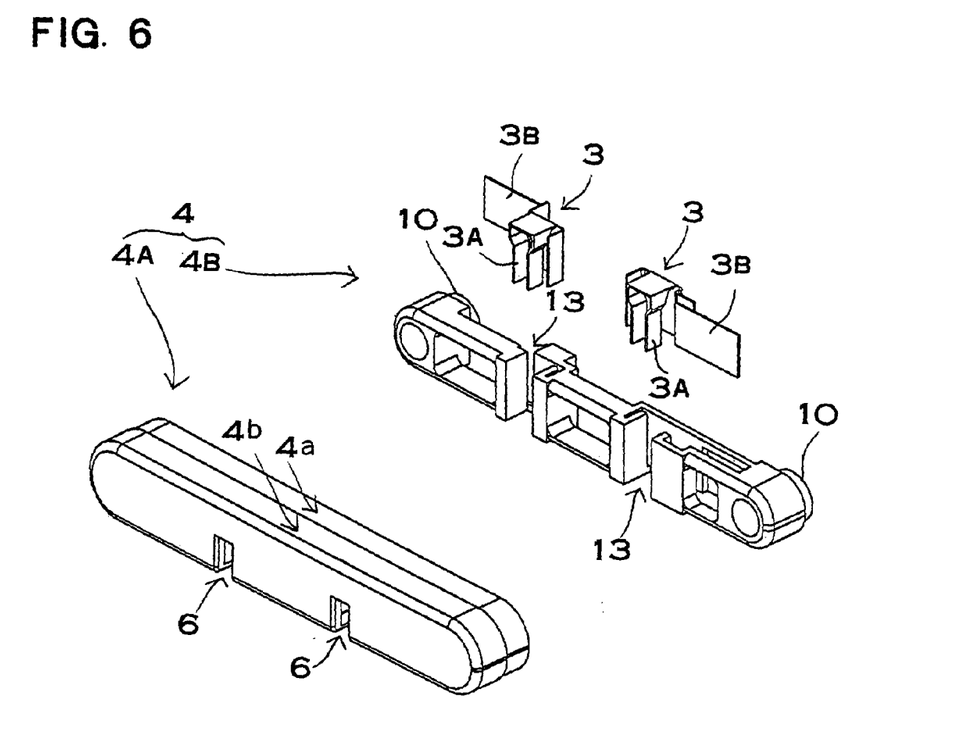
FIG. 6 is an exploded perspective view of the holder shown in FIG. 4.
Figure 7:
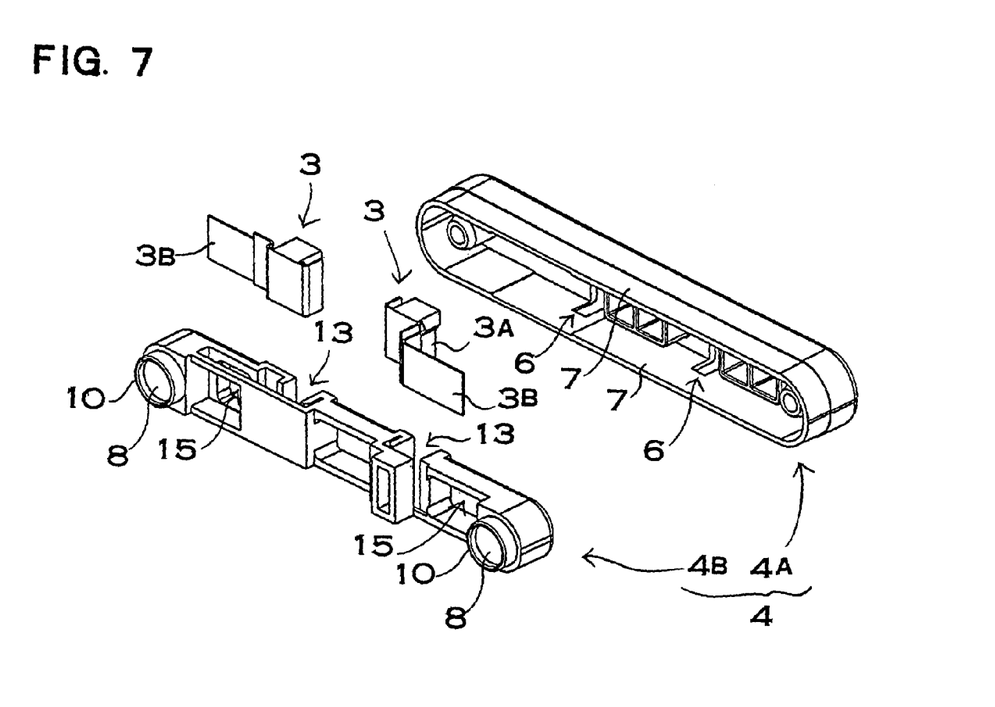
FIG. 7 is an exploded perspective view of the holder shown in FIG. 5.

A perspective view of the holder 4 is shown in FIGS. 4 and 5. FIG. 5 is a perspective diagram of the holder 4 of FIG. 4 as viewed from the other side. The holder 4 shown in these drawings comprises a first holder 4A, a second holder 4B fitted in the first holder 4A and output terminals 3 fixed so as to be interposed between the first holder 4A and the second holder 4B as shown in the exploded perspective views of FIGS. 6 and 7. FIG. 7 is a perspective diagram of the holder 4 of FIG. 6 as viewed from the other side. Further, FIGS. 8 and 9 each are a perspective view illustrating how the output terminals 3 are attached to the second holder 4B.

Figure 8:
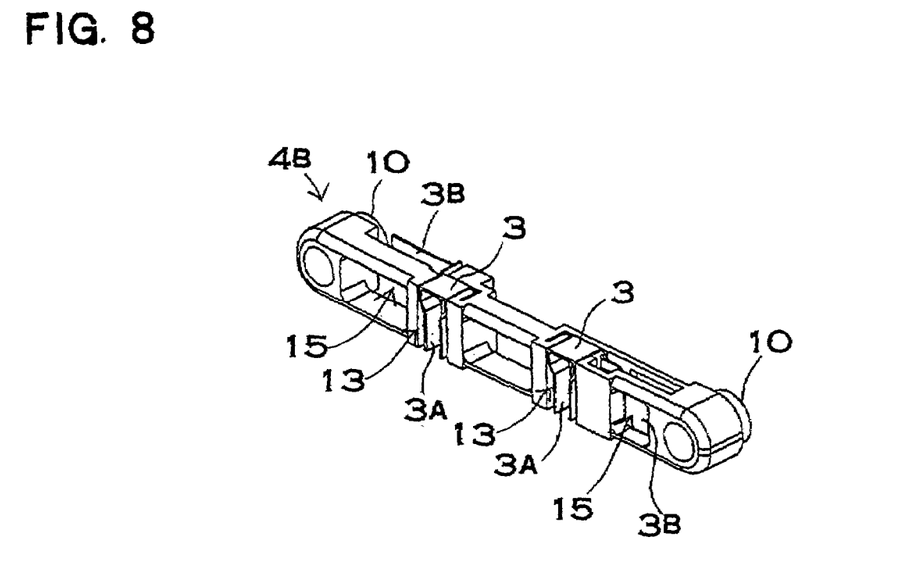
FIG. 8 is a perspective view illustrating how an output terminal is attached to the second holder shown in FIG. 6.
Figure 9:
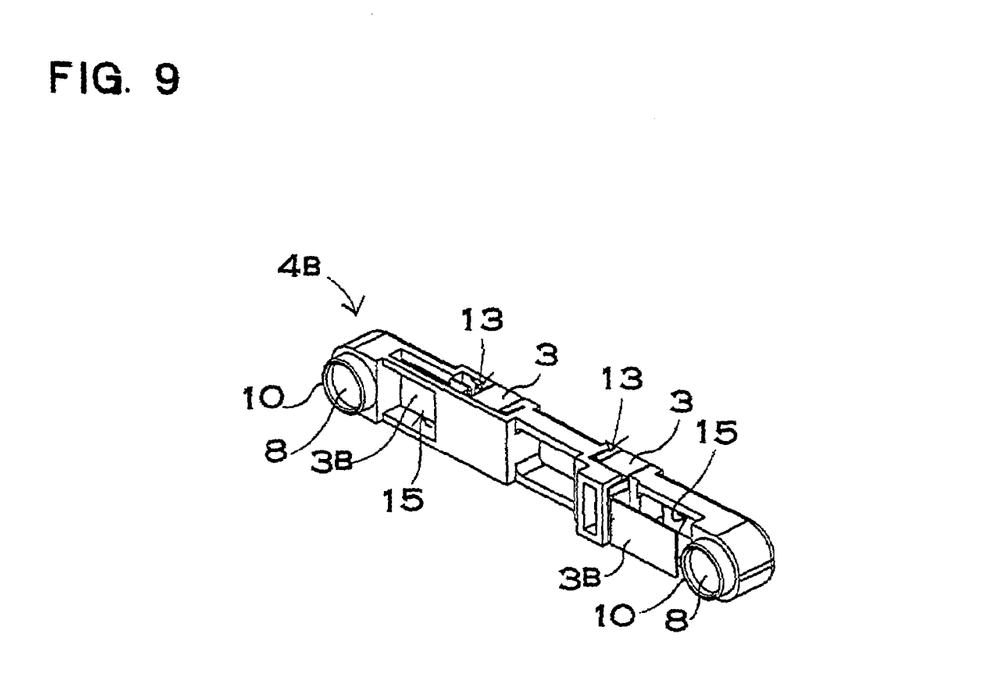
FIG. 9 is a rear perspective view of the second holder shown in FIG. 8.

FIG. 9 is a perspective diagram of the second holder 4B of FIG. 8 as viewed from the other side.

The first holder 4A and the second holder 4B are molded plastic products, and the output terminals 3 are obtained by press-molding a metal sheet. The holder 4 is shaped such that the periphery of the first holder 4A disposed outside follows the periphery of the cell 2. The periphery of the holder 4 is fully or substantially flush with the periphery of the cell 2. Referring to the first holder 4A shown, the size of the attaching portion 4a, which is a part of the periphery that is coated with the adhesive solution 20 to provide a plastic protective layer 1 thereon, is slightly smaller than the size of the non-attaching portion 4b on which the plastic protective layer 1 is not provided. The holder 4 can have the plastic protective layer 1 bonded thereto without causing exfoliation of the plastic protective layer 1. This is because the plastic protective layer 1 can be provided in such an arrangement that it doesn't extend from the level of the non-attaching portion 4b of the holder 4. Also, the non-attaching portion 4b of the holder may by flush with the surface of the plastic protective layer 1.

The first holder 4A is obtained by molding a plastic in such an arrangement that the side wall 7 of a cylinder is closed at one end and opened at the other. The side wall 7 is closed on the side thereof opposed to the cell 2 and opened on the other side. The side wall 7 is formed in a cylindrical shape following the periphery of the cell 2 and its periphery is substantially flush with that of the cell 2. The first holder 4A has terminal windows 6 provided therein. Each of the terminal windows 6 is an opening in which the power terminal of an electric appliance is inserted to make electrical connection to the output terminals 3 and have the output terminal 3 provided therein. The holder 4 has output terminals 3 provided thereinside to allow the insertion of the power terminals of an electrical appliance into the interior thereof, making it possible to prevent the output terminals 3 of the battery pack from being stained. Further, the contact of metal pieces with the output terminals 3 causing short-circuiting can be prevented. Moreover, since the output terminals 3 are provided in the holder 4, stain or change of properties can be prevented.

Figure 10:
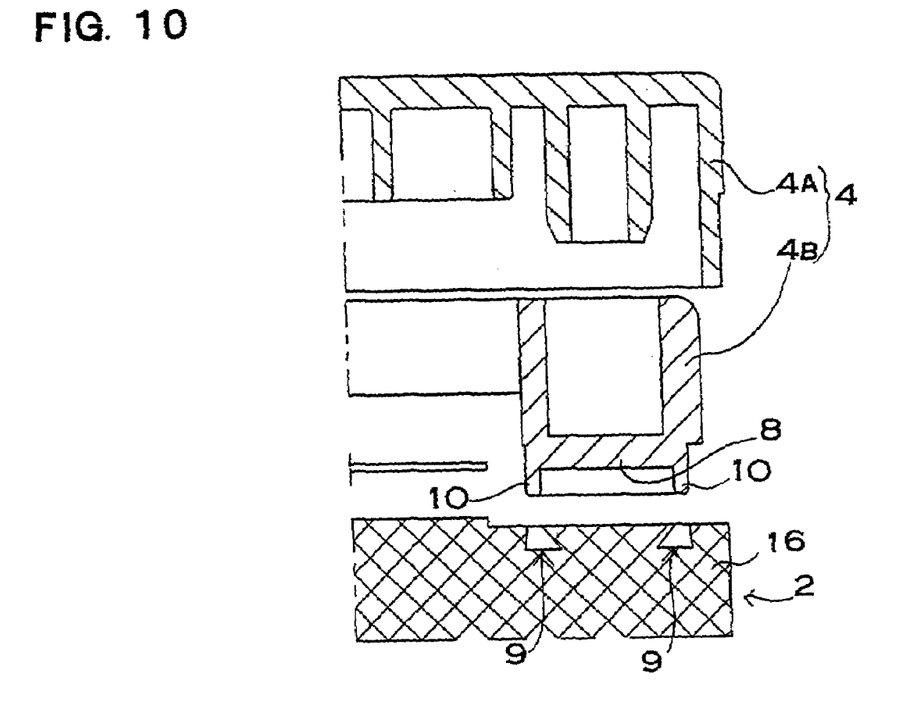
FIG. 10 is an exploded perspective view illustrating an example of the structure of connection between a holder and a cell.
Figure 11:
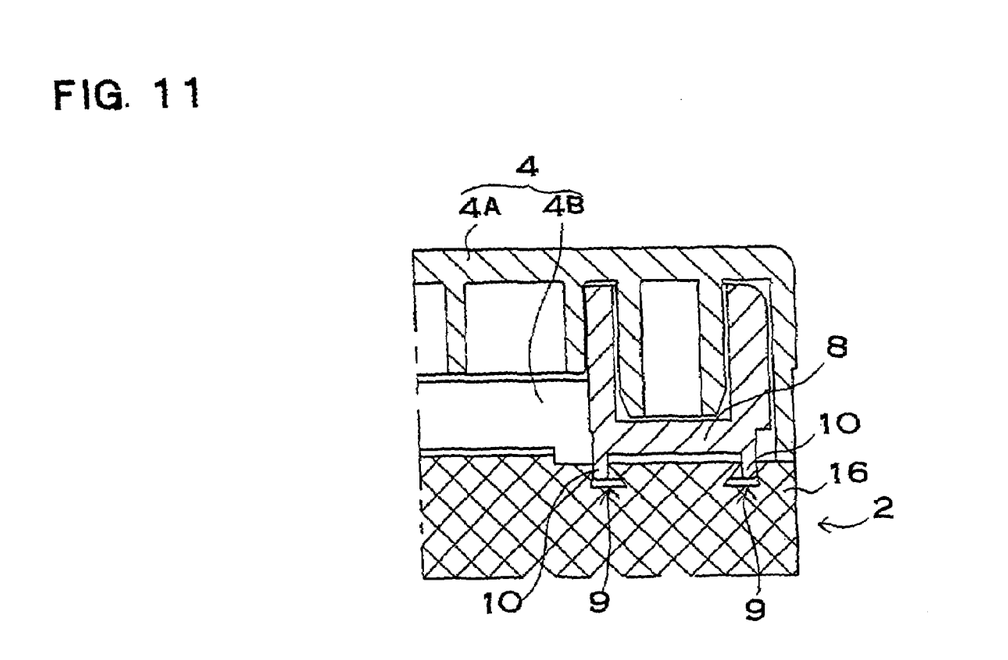
FIG. 11 is a sectional view illustrating the structure of connection between a holder and a cell shown in FIG. 10.

The second holder 4B is obtained by molding a plastic into an outer shape that can be fitted in the first holder 4A. The second holder 4B has a fixing portion 8 at which it is fixed to the cell 2. The second holder 48 shown has a fixing portion 8 provided at both ends thereof. The arrangement in which the fixing portion 8 is fixed to the cell 2 is shown in FIGS. 10 to 13. The second holder 4B of FIGS. 10 and 11 is fixed to the cell 2 by bonding the fixing portion 8 to the cell 2. The cell 2 has a connecting indentation 9 provided at the end of the electrode for bonding the fixing portion 8 of the holder 4 to the cell 2. The cell 2 shown has a ring groove-shaped connecting indentation 9 provided at the end of the electrode. The connecting indentation 9 is undercut in such an arrangement that the opening is narrower than the bottom. The second holder 4B has a connecting protrusion 10 provided at the fixing portion 8 which is fitted in the connecting indentation 9. The second holder 4B is fixed to the cell 2 by inserting the connecting protrusion 10 provided at the fixing portion 8 into the connecting indentation 9 of the cell 2 and then bonding them to each other.

Figure 12:
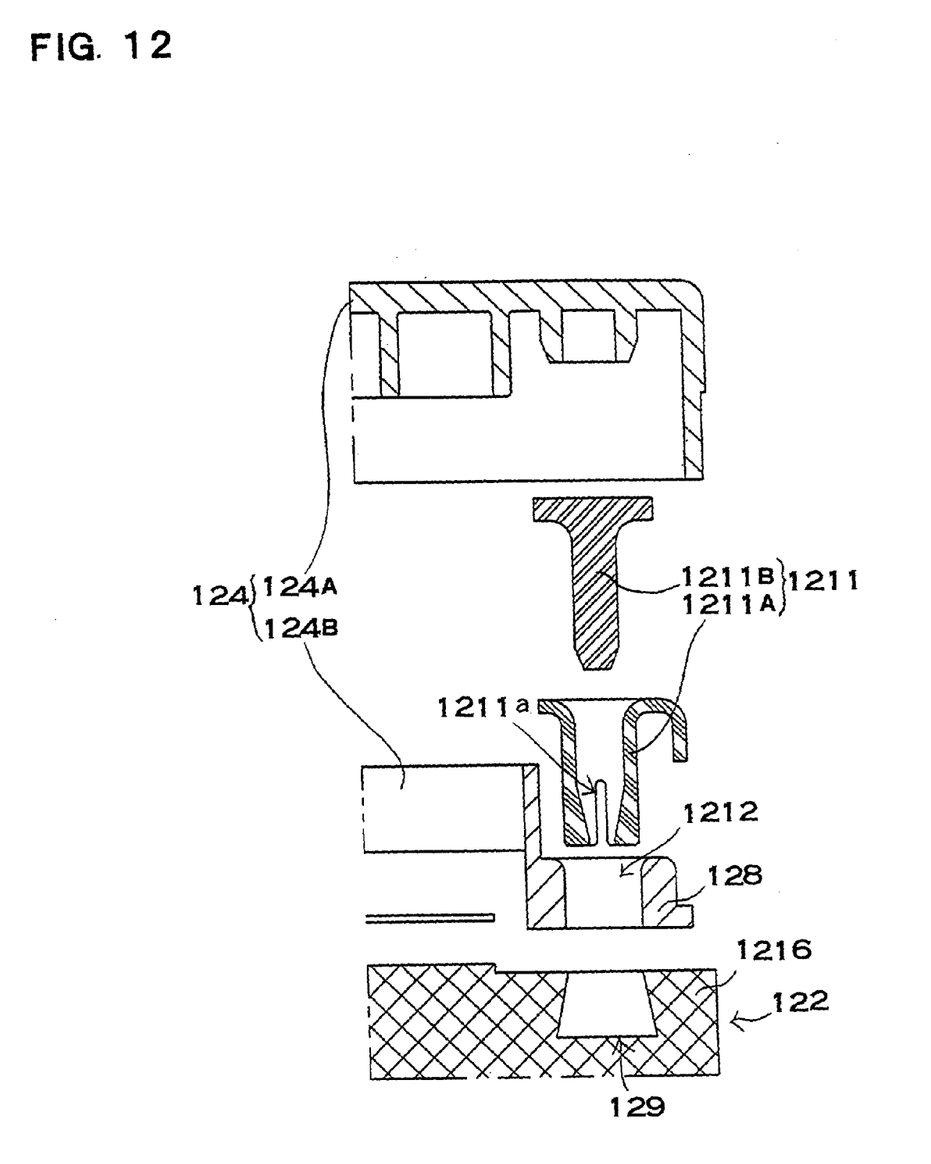
FIG. 12 is an exploded perspective view illustrating another example of the structure of connection between a holder and a cell.
Figure 13:
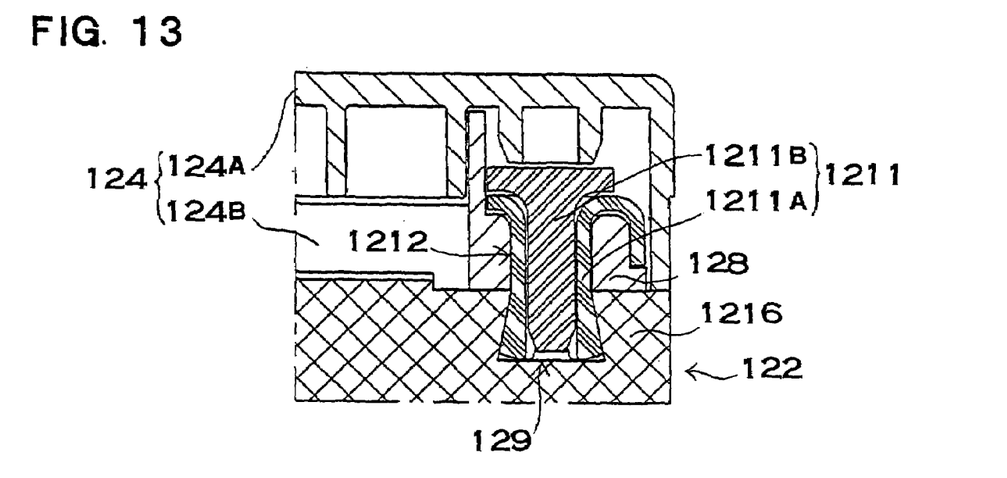
FIG. 13 is a sectional view illustrating the structure of connection between a holder and a cell shown in FIG. 12.

Further, the second holder 124B shown in FIGS. 12 and 13 is fixed to the cell 122 at a fixing portion 128 with a rivet 1211. The cell 122 to which the second holder 124B is fixed with the rivet 1211, also has a connecting indentation 129 provided at the end of the electrode. The connecting indentation 129, too, is undercut in such an arrangement that the opening is narrower than the bottom. The rivet 1211 comprises a cylindrical sheath 1211A which is inserted in the connecting indentation 129 of the cell 122 and a press-fit pin 1211B which is inserted in the interior of the sheath 1211A. The sheath 1211A comprises a lower part having an outer shape substantially the same as the inner shape of the connecting indentation 129 which gradually increases in wall thickness toward the lower end thereof and has an axial slit 1211a provided at the lower part thereof. The second holder 124B has a through-hole 1212 provided at the fixing portion 128 through which the sheath 1211A of the rivet 1211 is inserted in the cell 122 to connect the second holder 124B to the cell 122. In these drawings, the reference numeral 1216 indicates a sealing plate.

The second holder 124B having such an arrangement is connected to the cell 122 as follows.

(1) The second holder 124B is set on the end of the electrode of the cell 122.
(2) The sheath 1211A of the rivet 1211 is inserted in the through-hole 1212 provided at the fixing portion 128 of the second holder 124B to put the lower end of the sheath 1211A in the connecting indentation 129 of the cell 122.
(3) The press-fit pin 1211B of the rivet 1211 is pressed into the cell 122. The press-fit pin 1211B thus pressed in expands the lower end of the sheath 1211A in the undercut connecting indentation 129 so that the sheath 1211A cannot be pulled out of the connecting indentation 129.

After fixing the second holders 4B and 124B to the elementary batteries 2 and 122, the first holders 4A and 124A are then connected to the second holders 4B and 124B, respectively. The second holders 4B and 124B are formed in a shape that can be fitted in the first holders 4A and 124A, respectively. Accordingly, the first holders 4A and 124A are fixed to the elementary batteries 2 and 122 at a predetermined position by fitting the second holders 4B and 124B in the elementary batteries 2 and 122, respectively. The first holders 4A and 124A attached at this position are bonded and fixed to the second holders 4B and 124B, respectively. Alternatively, the first holders 4A and 124A may be ultrasonically welded and fixed to the second holders 4B and 124B, respectively. The battery pack comprising the first holders 4A and 124A fixed to the second holders 4B and 124B and the second holders 4B and 124B fixed to the elementary batteries 2 and 122, respectively, can have the holders 4 and 124 firmly fixed to the cell at a predetermined position. However, the first holder is connected to the cell with a plastic protective layer and thus is not necessarily needed to be fixed to the second holder.

To the second holder 4B are attached the output terminals 3 before the step of fixing the second holder 4B to the cell 2. The second holder 4B has fitting indentations 13 provided therein for fitting the output terminal 3 in the cell 2 at a predetermined position. The output terminal 3 shown in the perspective view of FIGS. 6 and 7 comprises an elastic clamping portion 3A which is connected to the power terminal of an electrical appliance and a connecting portion 3B which is connected to the cell 2 or the protective element 14. The elastic clamping portion 3A has a pair of elastic members for elastically clamping the power terminal from both the sides thereof. The elastic clamping portion 3A is fitted in the fitting indentation 13 of the second holder 4B so that it is attached at a predetermined position. The second holder 4B has a fitting indentation 13 provided therein for fitting the elastic clamping portion 3A of the output terminal 3 therein. The fitting indentation 13 is disposed at a position opposed to the terminal windows 6 of the first holder 4A so that the power terminal of an electrical appliance inserted in the holder 4 through the terminal windows 6 are electrically connected to the elastic clamping portion 3A.

The connecting portion 3B of the output terminal 3 is attached in such an arrangement that it is exposed on the cell side of the second holder 4B. This arrangement is made to connect the connecting portion 3B to the electrode or protective element 14 of the cell 2. Further, in order to weld the connecting portion 3B to the cell 2 or the protective element 14, the second holder 4B has through-holes 15 provided therein. The second holder 4B is arranged such that an electrode for welding is inserted in the through-holes 15 with the connecting portion 3B in contact with the electrode or protective element 14 to connect the connecting portion 3B to the electrode or the protective element 14. The output terminal 3 is adapted to connect the second holder 4B to the cell 2. This is because the connecting portion 3B is connected to the cell 2 or the protective element 14 and the elastic clamping portion 3A is fitted in the fitting indentation 13. The second holder 4B having such an arrangement is set at a predetermined position on the cell 2 with the output terminals 3 attached thereto. The connecting portion 3B of the output terminals 3 are spot-welded or otherwise connected to the electrode or the protective element 14 and then firmly connected to the cell 2 optionally with the rivet 11.

The cell 2 of the battery pack is a chargeable secondary battery such as lithium ion battery, nickel-hydrogen battery and nickel-cadmium battery. The battery pack of FIGS. 1 and 2 comprises one thin battery. However, the battery pack of the invention is not limited to thin battery with respect to cell, and the number of elementary batteries is not limited to one. As such a cell there may be also used a cylindrical battery or prismatic battery. Further, a plurality of batteries may be used in series or in parallel. In the battery pack having a holder attached to the end of the electrode, the periphery of the holder and the cell are fully or substantially flush with each other regardless of the shape of the cell to establish an arrangement that the periphery of the holder follows the periphery of the cell.

The cell 2 has a safety valve 17 provided in the sealing plate 16 at positions corresponding to the end of the electrode at which the protruding electrode 2B is provided. The cell 2 shown has a protruding electrode 2B provided at the central portion of the sealing plate 16 and a safety valve 17 provided at a position apart from the protruding electrode 2B. The cell also may have a safety valve incorporated in the protruding electrode. The safety valve 17 opens when the inner pressure in the battery 2 exceeds a predetermined value. When the safety valve 17 thus opens, gas or the like is discharged from the interior of the battery 2 to inhibit the rise of the inner pressure in the outer case 2A. The safety valve 17 is a rupturable membrane attached airtightly to the opening formed in the sealing plate 16. When the inner pressure in the battery 2 reaches a predetermined value, the rupturable membrane is ruptured to open the safety valve 17. The rupturable membrane is made of a metal foil, laminate of metal foil and plastic film, plastic film or the like so that it can be ruptured at a predetermined pressure. As the safety valve there maybe also used a rupturable structure formed by thinning a part of the outer case instead of the rupturable membrane.

The battery pack shown has the output terminals 3 connected to the electrode of the cell 2 through the protective element 14. The protective element 14 is a breaker which cuts electric current when excess current flows through the cell 2 or PTC, fuse or the like which cuts electric current when the battery temperature exceeds a predetermined value. The protective element 14 is provided interposed between the end of the electrode and the second holder 4B. The second holder 4B has a receiving portion 18 provided opposed to the end of the electrode for receiving the protective element 14. The protective element 14 has one terminal connected to the protruding electrode 2B of the cell 2 and the other connected to the connecting portion 3B of the output terminals 3.

The battery pack shown has the protective element 14 connected between the output terminals 3 and the cell 2. The production cost of the battery pack can be reduced by the use of the simplest circuit configuration. However, the battery pack of the invention may have a circuit board incorporated in the holder so that a battery protective circuit realized by an electronic circuit can be packaged in the circuit board. The protective circuit packaged in the circuit board can detect overcharge, overdischarge, overcurrent, etc. to cut electric current and, when the battery temperature exceeds a predetermined value, cuts electric current to protect the cell. The battery pack having a protective circuit packaged therein can be free of protective element. This is because the protective circuit protects the battery.

To the cell 2 are attached the protective element 14, the output terminal 3 and the holder 4 to produce a battery core pack 5. The core pack 5 is dipped in the adhesive solution as shown in FIG. 3 so that the cell 2 and the holder 4 are coated with the plastic protective layer 1. As the adhesive solution 20 there is preferably used a polyurethane emulsion. This is because the plastic protective layer 1 formed by curing such a polyurethane emulsion shows a strong adhesion to the cell 2 and the holder 4 as well as a high toughness and an excellent impact resistance. However, the adhesive solution 20 for forming the plastic protective layer 1 does not necessarily need to be a polyurethane emulsion. For example, a polyurethane-based adhesive such as a solvent type one-pack polyurethane and two-pack polyurethane, an acrylic adhesive, an epoxy-based adhesive, a silicon-based adhesive, etc. may be used.

The polyurethane emulsion to be used as the plastic protective layer 1 is produced from a compound A which is an organic diisocyanate, a compound B1 made of a polyol mixture and a compound B2 having one hydrophilic center and at least two active hydrogen groups. The polyurethane emulsion thus produced is a crosslinkable polyurethane emulsion comprising as compound B1 a polyol mixture having at least 2.05 functional groups on the average that forms an extremely good plastic protective layer 1. The plastic protective layer 1 thus formed is extremely excellent in various physical properties such as film hardness, film strength, water resistance, hot water resistance and alcohol resistance.

In other words, the polyurethane emulsion comprises a reaction product obtained by emulsifying and dispersing an intermediate product produced from a compound A made of an organic diisocyanate, a compound B1 made of a polyol mixture having not smaller than at least 2.05 functional groups on the average and a compound B2 having one hydrophilic center and at least two active hydrogen groups in water.

The compound B1, which is a polyol mixture having not smaller than 2.05 functional groups on the average, can be produced from a polyol mixture of a bifunctional polyol and a trifunctional or higher polyol. The compound B1 is preferably a polyol mixture of a bifunctional polyol and a trifunctional polyol the average number of functional groups of which is from 2.05 to 2.6. When the average number of functional groups falls below 2.05, the resulting cured product exhibits deteriorated physical properties, making it impossible to realize excellent properties. On the contrary, when the average number of functional groups exceeds 2.6, emulsification and dispersion cannot be effected under desirable conditions. Further, the compound B1, which is a polyol mixture of a bifunctional polyol and a trifunctional polyol, is preferably arranged such that the molecular weight of the trifunctional polyol is smaller than the molecular weight of the bifunctional polyol and the molecular weight of the bifunctional polyol and the trifunctional polyol are from 700 to 3,000 from 400 to 1,200, respectively. The reason why as the trifunctional polyol there is used one having a small molecular weight is that the polyol mixture can be dispersed and emulsified under desirable conditions. Referring further to the polyol mixture, an ε-caprolactone-basedpolyol is used as the trifunctional polyol by way of example.

The polyurethane emulsion may comprise a pigment incorporated therein to adjust the color of the plastic protective layer 1. The pigment is preferably mixed with the polyol mixture which is the compound B1. Further, as the pigment to be mixed with the polyol mixture which is the compound B1 there is preferably used an organic pigment. As the pigment there may be used a carbon black. However, the polyurethane emulsion may also comprise an inorganic pigment incorporated therein. Alternatively, the pigment may be added to the polyurethane emulsion having a reaction product emulsified in water rather than to the polyol mixture.

The polyurethane emulsion comprises the compounds B1 and B2 incorporated therein in an amount of preferably from 0.45 to 1.02 equivalents, more preferably from 0.50 to 0.95 equivalents, most preferably from 0.70 to 0.93 per equivalent of the compound A. When the added amount of the compounds B1 and B2 per equivalent of the compound A is too small, the resulting reaction product has a reduced molecular weight that deteriorates the physical properties of the plastic protective layer 1. On the contrary, when the added amount of the compounds B1 and B2 per equivalent of the compound A is too great, the resulting reaction product cannot be emulsified and dispersed under desirable conditions.

The aforementioned polyurethane emulsion is cured to form the plastic protective layer 1. The plastic protective layer 1 can form a coat having a tensile break strength of not smaller than 800 kg/cm$^2$ and a pencil hardness of not lower than 2H. The tensile break strength and the pencil hardness of the plastic protective layer 1 can be adjusted to a range of from 800 to 1,500 kg/cm$^2$ and a range of from 3H to 5H, respectively, by adjusting the formulation of the starting materials of the compounds A, B1 and B2 or their mixing ratios.

The polyurethane emulsion may comprise a thixotropic material incorporated therein so that it can be efficiently spread to form the plastic protective layer 1. This is because the adhesive solution 20 such as polyurethane emulsion having a thixotropic material incorporated therein doesn't run down as droplet toward the lower end of the core pack 5 when the core pack 5 is dipped in the adhesive solution 20 and then withdrawn therefrom. The polyurethane emulsion having a thixotropic material incorporated therein becomes liquid when given stress such as vibration. The core pack 5 is dipped in the polyurethane emulsion to which stress has been applied so that it is coated with the polyurethane emulsion on the surface thereof. When the core pack 5 thus coated is then withdrawn from the polyurethane emulsion, no stress is applied to the polyurethane emulsion thus spread over the surface of the core pack 5. Thus, the polyurethane emulsion doesn't drip from the core pack 5. As the thixotropic material, finely divided synthetic silica is used. However, it goes without saying that as the thixotropic material to be incorporated in the adhesive solution 20 there may be used one other than finely divided synthetic silica. The amount of the finely divided synthetic silica to be incorporated as thixotropic material in the polyurethane emulsion is preferably from 3 to 20 parts by weight based on 100 parts by weight of the components contained in the polyurethane emulsion excluding water content.

Further, the plastic protective layer 1 of polyurethane emulsion may comprise a carbon black pigment incorporated therein and then be spread. The coat layer thus formed is then irradiated with a laser beam to cause sublimation of carbon black.

In some detail, the aforementioned polyurethane emulsion is prepared as follows. The polyurethane emulsion comprises a reaction product obtained by self-emulsifying and dispersing an intermediate product comprising the following components (1) to (3) in water.
(1) Compound A . . . Compound A made of an organic diisocyanate
(2) Compound B1 . . . Polyol mixture having greater than at least 2.05 functional groups on the average
(3) Compound B2 . . . Compound having one hydrophilic center and at least two active hydrogen groups The polyol mixture of compound B1 is obtained by mixing a bifunctional polyol with a bifunctional to tetrafunctional polyol, preferably a trifunctional polyol. The polyol mixture having not smaller than 2.05 functional groups on the average is obtained by mixing a bifunctional polyol with a trifunctional or higher polyol. Referring to the reason why the average number of functional groups in the polyol mixture of compound B1 is predetermined to be not smaller than 2.05, when the average number of functional groups falls below this value, the resulting reaction product of polyurethane emulsion cannot be sufficiently polymerized. The plastic protective layer 1 formed by curing such a reaction product is left uncured. Even if cured, the resulting coat layer leaves something to be desired in film hardness, film strength, water resistance, hot water resistance and alcohol resistance, exhibits a poor heat resistance and remains viscous on the surface thereof to disadvantage.

Supposing that the number of parts of the bifunctional polyol to be mixed is x and the number of parts of the trifunctional polyol to be mixed is y, the average number of functional groups in the polyol mixture obtained by mixing the bifunctional polyol with the trifunctional polyol is calculated by the following equation.

Average number of functional groups$=(2x+3y)/(x+y)$

The compound B1 comprising a bifunctional polyol and a trifunctional polyol is arranged such that the molecular weight of the bifunctional polyol is from 500 to 4,000, preferably from 700 to 2,000, more preferably from 800 to 1,500. When the molecular weight of the bifunctional polyol is not greater than 500, the resulting intermediate product exhibits too high a viscosity and thus can be difficultly emulsified. When the molecular weight of the bifunctional polyol is not smaller than 4,000, it is disadvantageous in that the resulting compound B1 exhibits a deteriorated compatibility with other components, particularly the compound B2. Further, the resulting coat layer exhibits a deteriorated film strength and film hardness as well as a deteriorated heat resistance to disadvantage.

Although the bifunctional polyol to be incorporated in the compound B1 is not limited, as such bifunctional polyols there may be used, e.g., the following known compounds and mixture of two or more thereof. Preferred among these compounds are the compounds (a) and (c) from the standpoint of compatibility with other components, inhibition of viscosity rise of synthesis system, emulsifiability, hydrolyzability, etc.

(a) Polyoxypolyalkylene Diol
This compound can be obtained by the addition polymerization of monomolecular diol with alkylene oxide.

(b) Polyester-based Diol
This compound can be obtained by the condensation polymerization of dicarboxylic acid with diol.

(c) Polyoxytetramethylene Polyol
This compound can be obtained by the ring opening polymerization of monomolecular diol with furane.

(d) Carbonate-based Polyol
This compound can be obtained by the condensation polymerization of monomolecular diol with dialkyl carbonate.

(e) Lactone-based Polyol
This compound can be obtained by the ring opening polymerization of monomolecular diol with lactone.

(f) Castor Oil-based Polyol
This compound can be obtained as castor oil or ester exchange derivative thereof.

(g) Liquid Rubber-based Polyol
This compound can be obtained by the terminal hydroxylation of a butadiene rubber with hydrogen peroxide.

Examples of the monomolecular diol from which the polyoypolyalkylene diol is obtained include water, ethylene glycol, propylene glycol, diethylene glycol, dipropylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, 1,8-octanedil, 1,9-nonanediol, and neopentyl glycol.

Although the trifunctional or higher polyol to be incorporated in the bifunctional polyol is not limited, the following known compounds can be used for example.

(h) Polyoxypolyalkylene Polyol
This compound can be obtained by the addition polymerization of monomolecular polyol with alkylene oxide.

(i) Lactone-based Polyol
This compound can be obtained by the ring opening polymerization of monomolecular polyol with lactone.

(j) Mixture of Two or More of These Compounds
Preferred among these compounds is the compound (i) from the standpoint of compatibility with other components, emulsifiability, etc.

Examples of the monomolecular polyol from which the polyoxypolyalkylene polyol is obtained include glycerin, trimethanolpropane, hexanetriol, pentaerythritol, and diglycerin. Particularly preferred among these monomolecular polyols are glycerin and trimethanolamine. The molecular weight of the monomolecular polyol is from 300 to 1,000, preferably from 500 to 800. When the molecular weight of the monomolecular polyol is not greater than 300, the resulting intermediate product exhibits too high a viscosity and thus can be difficultly emulsified. On the contrary, when the weight of the monomolecular polyol is not smaller than 1,000, the resulting crosslinking effect is deteriorated. Thus, the resulting coat layer exhibits a poor film strength, hot water resistance, alcohol resistance and hardness.

Examples of the organic diisocyanate which is the compound A to be incorporated in the polyurethane emulsion include aromatic alicyclic diisocyanates such as 2,4-tolylenediisocyanate, 2,6-tolylenediisocyanate and mixture thereof (TDI), 4,4'-diphenylmethanediisocyanate (MDI), naphthalene-1,5-diisocyanate (NDI), 3,3-dimethyl-4,4-biphenylenediisocyanate (TODI), polymethylene polyphenyldiisocyanate, xylylene diisocyanate (XDI) and phenylene diisocyanate, and aliphatic diisocyanates such as 4,4'-methylenebiscyclohexyl diisocyanate (hydrogenated MDI), hexamthylene diisocyanate (HDI), isophorone diisocyanate (IPDI) and dimethylcyclohexane diisocyanate (hydrogenated XDI).

A mixture of two or more of these organic diisocyanates may be used as well.

Preferred among these organic diisocyanates are low activity polyisocyanates, more preferably XDI, hydrogenated MDI, HDI, IPDI and hydrogenated XDI, even more preferably HDI and IPDI, because sudden reaction with water is preferably avoided until the emulsion formed by mixing the intermediate product with water becomes stabilized. Even more preferably, IPDI is used because of its low vapor density at ordinary temperature and amorphousness.

Examples of the compound B2 include 2,2-dimethylolpropionic acid, and 2,2-dimethylolbutanoic acid. Other examples of the compound B2 include diaminocarboxylic acids such as lysine, cystine and 3,5-diaminocarboxylic acid.

Particularly preferred among these compounds are 2,2-dimethylolpropionic acid and 2,2-dimethylolbutanoic acid, more preferably 2,2-dimethylolbutanoic acid from the standpoint of compatibility with other components. In order to actually use these compounds, these compounds are neutralized with a neutralizing agent to form a salt with the carboxylic acid incorporated in the polyurethane polymer.

Examples of the neutralizing agent employable herein include tertiary amines such as trimethylamine, triethylamine, triisopropylamine, tributylamine, triethanolamine, N-methyldiethanolamine and N-methylmorpholine, and alkalis such as sodium hydroxide, potassium hydroxide and ammonia. In order to enhance the weathering resistance and water resistance of the coat layer dried, neutralizing agents having a high volatility are preferred such as trimethylamine and triethylamine. These neutralizing agents may be used singly or in admixture of two or more thereof. The amount of the neutralizing agents to be used is from 0.3 to 1 mol per mol of the compound B2. When the amount of the neutralizing agents to be used is not greater than 0.3 mols, the mixture can be difficultly emulsified.

The amount of the compound B2 to be incorporated is from 0.1 to 0.4 equivalents, preferably from 0.2 to 0.3 equivalents per equivalent of the organic diisocyanate which is the compound A. When the amount of the compound B2 to be incorporated is not greater than 0.1 equivalents per equivalent of the organic diisocyanate, the mixture can be difficultly emulsified. On the contrary, when the amount of the compound B2 to be incorporated is not smaller than 0.4, the resulting plastic protective layer 1 exhibits deteriorated film properties, hot water resistance and alcohol resistance.

The polyurethane emulsion doesn't necessarily need to comprise a chain extender incorporated therein but may comprise a chain extender incorporated therein as necessary so far as no remarkable viscosity rise causing impairment of physical properties occurs at the step of synthesis of intermediate product.

The chain extender maybe incorporated in the intermediate product. In particular, diamine may be put in water to cause emulsification. Examples of the chain extender employable wherein include the aforementioned monomolecular diols, various diamines such as ethylenediamine, propylenediamine, hexamethylenediamine, tolylenediamine, xylylenediamine, diphenyldiamine, diaminodiphenylamethane, diaminocyclohexylmethane, piperadine, 2-methylpiperadine and isophoronediamine, alcoholamines such as monoethanolamine, diethanolamine and N-methyldiethanolamine, and water.

The amount of the compound B1 to be incorporated is, e.g., from 0.3 to 0.7 equivalents per equivalent of the organic diisocyanate which is the compound A. However, referring to the ratio of equivalent of active hydrogen group in the compounds B1 and B2 to isocyanate group in the organic diisocyanate which is the compound A, i.e., active hydrogen group to isocyanate group, the total amount of the compounds B1 and B2 is adjusted such that the amount of active hydrogen group is from 0.45 to 1.02 equivalents, preferably from 0.5 to 0.95 equivalents per equivalent of isocyanate group. When the amount of active hydrogen group is not greater than 0.45 equivalents per equivalent of isocyanate group, the resulting polyurethane emulsion exhibits a reduced molecular weight that deteriorates the film properties and strength. On the contrary, when the amount of active hydrogen group is not smaller than 1.02 equivalents per equivalent of isocyanate group, the presence of excessive amount of active hydrogen group is not significant. Further, when the rate of addition of active hydrogen group to the reaction system is too high, the molecular weight of the polyurethane emulsion is reduced to disadvantage.

When the amount of active hydrogen group is close to 0.95 equivalents per equivalent of isocyanate group, the resulting intermediate product shows a sudden viscosity rise but can be prevented from gelling. This is because the remarkable viscosity rise is accompanied by the inhibition of the progress of reaction of the active reactive group by which the polymer is terminated. This reaction may be effected in an organic solvent compatible with water. Water is then added to the reaction solution. Thereafter, the organic solvent may be removed. The resulting reaction product may be forcedly dispersed directly in water to obtain a polyurethane emulsion.

The amount of water in which the intermediate product is emulsified is not smaller than 100 parts by weight, preferably from 130 to 300 parts by weight, more preferably from 150 to 250 parts by weight based on 100 parts by weight of the reaction product. When the amount of water is not greater than 100 parts by weight, the intermediate product gels, making it impossible to obtain a well-emulsified polyurethane emulsion. The polyurethane emulsion thus obtained is then allowed to stand at ordinary temperature for 12 hours or longer so that it is stabilized. When the polyurethane emulsion is allowed to stand under these conditions, the reaction of the remaining isocyanate group is completed and carbon gas which is a by-product is released. Accordingly, the polyurethane emulsion which has been allowed to stand for a predetermined period of time can form a plastic protective layer 1 free of foam, making it possible to provide an ideal coat layer. The polyurethane emulsion comprising a solvent may be subjected to desolvation in vacuo.

The polyurethane emulsion thus obtained exhibits a resin concentration of not greater than 40% and a liquid viscosity of not greater than 800 cps at 23° C. When a polyurethane emulsion having a higher resin concentration is needed, the polyurethane emulsion may be subjected to dehydration at a higher degree of vacuum to increase the resin concentration and liquid viscosity before use.

Examples of the organic solvent to be used in the polyurethane emulsion include ketone-based solvents such as acetone, methyl ethyl ketone, methyl isobutyl ketone and cyclohexanone, ester-based solvents such as ethyl acetate, butyl acetate and isobutyl acetate, aromatic solvents such as toluene and xylene, and chlorine-based solvents such as methylene chloride. Other examples of the organic solvent include organic solvents inert to isocyanate such as dioxane, dimethylformamide, N-methylpyrrolidone and tetrahydrofurane. Nothing can be better than using the polyurethane emulsion free of solvent. However, if any solvent is used, ketone-based solvents are desirable because they are water-soluble and can be easily removed in vacuo.

Further, the polyurethane emulsion may comprise a urethanation catalyst incorporated therein. As the urethanation catalyst there may be used any known urethanation catalyst. In some detail, an organic metal compound such as dibutyltin dilaurate and lead octylate or an organic diamine such as triethylenediamine and N,N'-tetramethylbutanediamine may be used. The urethanation temperature is from 10° C. to 120° C., preferably from 30° C. to 80° C.

Moreover, the polyurethane emulsion may comprise known additives and aids incorporated therein as necessary. Examples of these additives and auxiliaries employable herein include pigments, plasticizers, fire retardants, organic and inorganic fillers, reinforcing agents, gelling inhibitors, thickening agents, viscosity adjustors, antistatic agents, surface active agents (leveling agent, anti-foaming agent, dispersion stabilizer, blocking inhibitor), oxidation inhibitors, light-stabilizers, and ultraviolet absorbers.

Further, the polyurethane emulsion may be used in the form of blend with other resin-based emulsions. For example, the polyurethane emulsion may be blended with an acrylic emulsion, polyester emulsion, polyolefin emulsion, latex or the like.

These additives and auxiliaries may be incorporated in the polyol mixture which is the compound B1 as starting material. Water-soluble additives and auxiliaries such as dye and other resin-based emulsion may be incorporated in the polyurethane emulsion. The mixing of these components may be accomplished by the use of ball mill, sand grind mill or the like.

Figure 14:
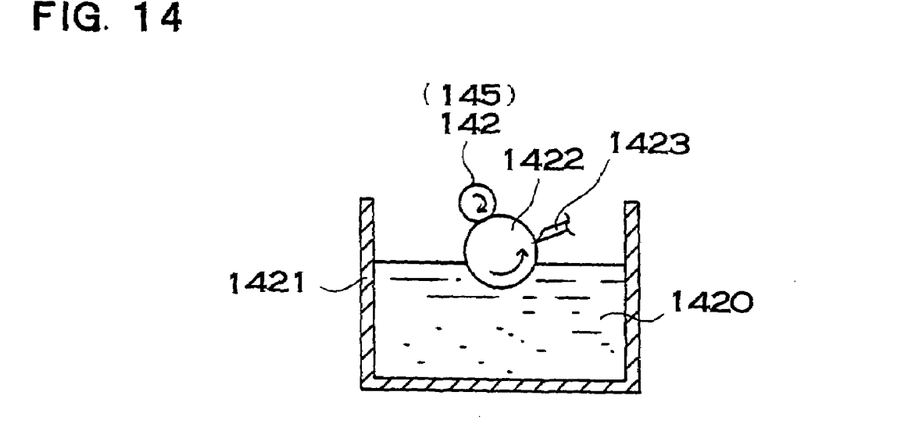
FIG. 14 is a sectional view illustrating another example of how the core pack of a battery is coated with the adhesive solution.
Figure 15:
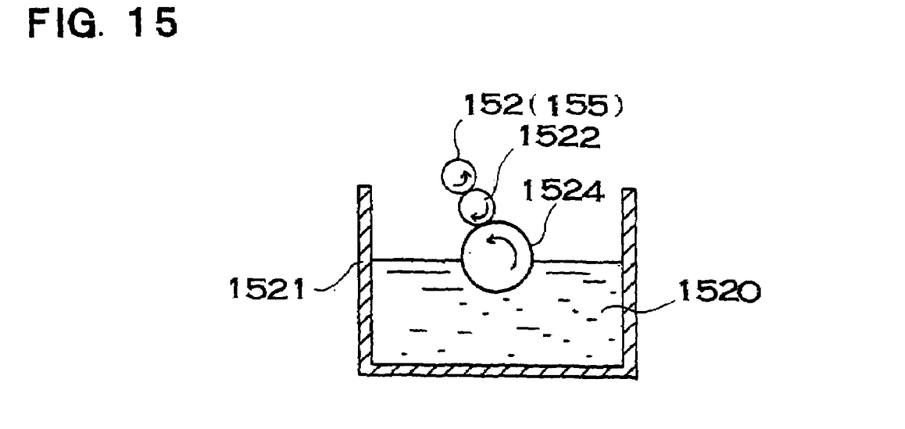
FIG. 15 is a sectional view illustrating a further example of how the core pack of a battery is coated with the adhesive solution.

The polyurethane emulsion thus obtained is then spread over the core pack 145 by the dipping method shown in FIG. 3 or using a coating roller 1422 shown in FIG. 14. Alternatively, the polyurethane emulsion may be spread over the core pack with a brush or may be sprayed onto the surface of the core pack. The apparatus of FIG. 14 comprises a container 1421 filled with a polyurethane emulsion, a coating roller 1422 which is partly dipped in the polyurethane emulsion in the container 1421, a driving mechanism (not shown for rotating the coating roller 1422, and a scraper 1423 for adjusting the thickness of the polyurethane emulsion attached to the surface of the coating roller 1422. The core pack 145 and the cell 142 are rotated in contact with the coating roller 1422 so that the polyurethane emulsion attached to the surface of the coating roller 1422 is transferred to the surface of the core pack 145 and the cell 142. The method for spreading the polyurethane emulsion over the cell 142 or the core pack 145 in this structure is suitable for the case where the cell 142 is a cylindrical battery. While the apparatus of FIG. 14 is arranged such that the coating roller 1422 is dipped in the polyurethane emulsion, the polyurethane emulsion may be transferred from a transferring roller 1524 dipped in the polyurethane emulsion to a coating roller 1522 so that the polyurethane emulsion is spread over the surface of the cell 152 or the core pack 155 as shown in FIG. 15. The apparatus of FIG. 15 is arranged such that the transferring roller 1524 and the coating roller 1522 are rotated without slipping off each other to transfer the polyurethane emulsion from the transferring roller 1524 to the coating roller 1522. This apparatus allows the polyurethane emulsion to be spread to a uniform thickness without using any scraper. This is because when the polyurethane emulsion is transferred from the transferring roller 1524 to the coating roller 1522, the layer of polyurethane emulsion is adjusted uniform. In these drawings, the reference numerals 1420 and 1520 each indicate an adhesive solution.

For the measurement of tensile break strength of the polyurethane emulsion (resin concentration: 40%) thus obtained, the polyurethane emulsion may be spread over a plastic film in the following manner. In some detail, the polyurethane emulsion is spread over a PET film to a thickness of 150 μm, dried at room temperature for 12 hours, and then dried at 80° C. for 3 hours to obtain a light yellow transparent film-like plastic protective layer having a thickness of about 60 μm. This plastic protective layer is as hard as pencil hardness of not lower than 2H and as tough as tensile break strength of not smaller than 809 kg/cm$^2$ and is excellent in water resistance, hot water resistance and alcohol resistance.

The plastic protective layer formed by curing the aforementioned polyurethane emulsion exhibits extremely excellent physical properties and thus is ideal as plastic protective layer for the battery pack of the invention. However, the battery pack of the invention may have a plastic protective layer formed by curing the related art polyurethane emulsion. In order to make it clear how excellent the properties of the aforementioned polyurethane emulsion are as compared with that of the related art polyurethane emulsions, the invention will be further described in the following examples of the aforementioned polyurethane emulsion and the related art polyurethane emulsions. The term "parts" and "%" as used herein are meant to indicate "parts by weight" and "% by weight" unless other specified.

In the following examples of polyurethane emulsion, the compound A, the compound B1, the compound B2 and other compounds are used in an amount set forth in Table 1 to prepare a polyurethane emulsion.

In Table 1, IPDI which is an organic diisocyanate as compound A, polyols (1), (2), (3), (4) and (5) which are polyol mixtures as compound B1 and DMPA and DMBA which each are compound B2 are as follows.

IPDI which is an organic diisocyanate as compound A represents isophoronediisocyanate;

Polyol (1) is a polyoxypolypropylene polyol having a molecular weight of 1,000 and two functional groups;

Polyol (2) is a polyoxytetramethylene polyol having a molecular weight of 1,000 and two functional groups;

Polyol (3) is a polyol having a molecular weight of 305 and three functional groups obtained by the ring opening polymerization of trimethylolpropane with ε-caprolactone;

Polyol (4) is a polyol having a molecular weight of 1,000 and two functional groups obtained by the condensation polymerization of butanediol with adipic acid;

Polyol (5) is a carbonate-based polyol having a molecular weight of 1,000 and two functional groups obtained from hexanediol and diethyl carbonate; and DMPA and DMBA which each are compound B2 represent dimethylolpropionic acid and dimethylolbutanoic acid, respectively.

Further, in the following examples, the following catalysts, neutralizing agents, solvents, chain extenders, etc. are added as necessary, with the proviso that:

DBTL, which is a catalyst, represents dibutyltin dilaurate;
TEA, which is a neutralizing agent, represents triethylamine;

MEK, which is a solvent, represents methyl ethyl ketone; and

IPDA, which is a chain extender, represents isophoronediamine.

EXAMPLE 1

Into a four-necked flask with an agitator, a thermometer, a nitrogen seal pipe and a condenser are charged 150 parts of MEX, which is a solvent, 126 parts of polyol (1) aspolyolmixture of compound B1 and 8.3 parts of polyol (3). Thereafter, into the flask are charged 100 parts of IPDI, which is an organic diisocyanate as the compound A, and 0.1 parts of DBTL, which is a catalyst. The reaction mixture is then allowed to react at 80° C. for 3 hours. Into the flask is then charged a carboxylate solution of 50 parts of MEK which is a solvent, 18 parts of DMPA, which is the compound B2, and 18 parts of TEA, which is a neutralizing agent. The reaction mixture is further allowed to react at 80° C. for 2 hours to obtain a liquid product solution.

To the liquid product solution is then added dropwise an amine solution of 50 parts of MEK, which is a solvent, and 15.3 parts of IPDA, which is a chain extender. The reaction mixture is then allowed to undergo chain extension reaction for 1 hour. After the termination of the reaction, into the flask is charged 496 parts of water to cause phase inversion. The reaction solution is then allowed to stand as it is at room temperature for 12 hours. The reaction is terminated by the reaction of the remaining isocyanate group with excess water which has penetrated the cell.

Thereafter, MEK, which is a solvent, is removed using a rotary evaporator to obtain apolyurethane emulsion PE-1 having an intermediate product self-emulsified and dispersed in water. PE-1 thus obtained has a solid content of 35.1% and a viscosity of 600 cps at 25° C.

In Examples 2, 6, 7 and 8, PE-2, PE-6, PE-7 and PE-8 are synthesized from the formulation set forth in Table 1 in the same manner as in Example 1. The results of synthesis are set forth in Table 1.

EXAMPLE 3

Into a four-necked flask with an agitator, a thermometer, a nitrogen seal pipe and a condenser are charged 113 parts of polyol (2) as polyol mixture which is the compound B1 and 16.5 parts of polyol (3) as polyol mixture which is the compound B1. Thereafter, into the flask are charged 100 parts of IPDI, which is an organic diisocyanate as the compound A, and 0.1 parts of DBTL, which is a catalyst. The reaction mixture is then allowed to react at 80° C. for 3 hours. Into the flask is then charged a carboxylate solution of 36 parts of MEK, which is a solvent, 18 parts of DMPA, which is the compound B2, and 13.5 parts of TEA, which is a neutralizing agent. The reaction mixture is further allowed to react at 80° C. for 2 hours to obtain a liquid product solution.

After the termination of the reaction, into the flask is charged 446 parts of water to cause phase inversion. The reaction solution is then allowed to stand as it is at room temperature for 12 hours. The reaction is terminated by the reaction of the remaining isocyanate group with excess water which has penetrated the cell.

Thereafter, MEK, which is a solvent, is removed using a rotary evaporator to obtain a polyurethane emulsion PE-3. PE-3 thus obtained has a solid content of 35.6% and a viscosity of 300 cps at 25° C.

In Example 4, PE-4 is synthesized from the formulation set forth in Table 1 in the same manner as in Example 3. The results of synthesis are set forth in Table 1.

EXAMPLE 5

Into a four-necked flask with an agitator, a thermometer, a nitrogen seal pipe and a condenser are charged 94 parts of polyol (2) as polyol mixture which is the compound B1 and 25 parts of polyol (3) as polyol mixture which is the compound B1. Thereafter, into the flask are charged 100 parts of IPDI, which is an organic diisocyanate as the compound A, 0.1 parts of DBTL, which is a catalyst, and 9 parts of DMBA, which is the compound B2. The reaction mixture is then allowed to react at 80° C. for 3 hours. The reaction solution is then mixed with 9 parts of TEA, which is a neutralizing agent, to obtain a liquid product solution.

After the termination of the reaction, into the flask is charged 356 parts of water to cause phase inversion. The reaction solution is then allowed to stand as it is at room temperature for 12 hours. The reaction is terminated by the reaction of the remaining isocyanate group with excess water which has penetrated the cell to obtain a polyurethane emulsion PE-5. PE-5 thus obtained has a solid content of 39.0% and a viscosity of 650 cps at 25° C.

The excellent physical properties of the plastic protective layer formed by curing the aforementioned polyurethane emulsion is substantiated by the following tests. In Table 1, the polyurethane emulsions obtained in Examples 1 to 8 each are spread over a PET film to a thickness of 150 μm, dried at room temperature for 12 hours, and then dried at 80° C. for 8 hours to form a light yellow transparent dry film-like plastic protective layer 1 having a thickness of about 60 μm which is then tested for various physical properties as follows.

In Table 1, pencil hardness is measured according to JIS K5400. Tensile test properties are measured according to JIS K6301 (No. 3 dumbbell). As the tensile testing machine there is used a Type S-500 autograph (produced by Shimazdu Corporation). The tensile testing is effected at a pulling rate of 100 mm/min.

The results of measurement are set forth in Table 1.

TABLE 1

| Components and properties | Example | | | | | | | |
|---|---|---|---|---|---|---|---|---|
| | 1 | 2 | 3 | 4 | 5 | 6 | 7 | 8 |
| IPDI (organic diisocyanate as compound A) (parts) | 100 | 100 | 100 | 100 | 100 | 100 | 100 | 100 |
| Polyol mixture as compound B1 (parts) | | | | | | | | |
| Polyol (1) | 126 | 88 | — | 75 | — | 166 | — | — |
| Polyol (2) | — | — | 113 | — | 94 | — | — | — |

TABLE 1-continued

| Components and properties | Example | | | | | | | |
|---|---|---|---|---|---|---|---|---|
| | 1 | 2 | 3 | 4 | 5 | 6 | 7 | 8 |
| Polyol (3) | 8.3 | 12.4 | 16.5 | 33 | 25 | — | — | — |
| Polyol (4) | — | — | — | — | — | — | 166 | — |
| Polyol (5) | — | — | — | — | — | — | — | 166 |
| DBTL as catalyst (parts) | 0.1 | 0.1 | 0.1 | 0.1 | 0.1 | 0.1 | 0.1 | 0.1 |
| Compound B2 | | | | | | | | |
| DMPA (parts) | 18 | 18 | 18 | 9 | — | 19.8 | 18 | 18 |
| DMBA | — | — | — | — | 9 | — | — | — |
| TEA as neutralizing agent (parts) | 18 | 13.5 | 13.5 | 9 | 9 | 19.8 | 18 | 18 |
| MEK as solvent (parts) | 250 | 250 | 36 | 45 | — | 500 | 500 | 500 |
| IPDA as chain extender (parts) | 15.3 | 15.3 | — | — | — | 25.8 | 25.8 | 25.8 |
| Water as dispersant (parts) | 496 | 398 | 446 | 393 | 356 | 600 | 600 | 600 |
| Polyurethane emulsion | PE-1 | PE-2 | PE-3 | PE-4 | PE-5 | PE-6 | PE-7 | PE-8 |
| Solid content (%) | 35.1 | 37.0 | 35.6 | 35.6 | 39.0 | 26.3 | 26.1 | 26.3 |
| Static viscosity (cps/25° C.) | 600 | 750 | 300 | 700 | 650 | 300 | 600 | 4000 |
| Pencil hardness | 3H | 4H | 4H | 5H | 5H | 5B | 6B | H |
| Tensile testing properties | | | | | | | | |
| Strength at break (kg/cm$^2$) | 816 | 1,190 | 1,450 | 1,465 | 1,230 | 58 | 300 | 200 |
| Elongation at break (%) | 280 | 60 | 50 | 45 | 50 | 600 | 130 | 50 |

As can be seen in Table 1, the plastic protective layer of polyurethane emulsion exhibits extremely excellent physical properties, i.e., a tensile break strength as high as 816 to 1,465 kg/cm$^2$ and a pencil hardness as high as 3H to 5H. The plastic protective layer having such excellent physical properties exhibit excellent physical properties also when spread over the surface of the core pack. The plastic protective layer is also excellent in water resistance, hot water resistance and alcohol resistance.

The polyurethane emulsion PT-2 thus obtained is spread over the surface of an iron plate, aluminum plate and stainless steel plate to be used as outer case of cell and an unsaturated ester-based FRP, and then allowed to stand at ordinary temperature for 48 hours so that it is cured to form a plastic protective layer. To the surface of the plastic protective layer thus formed is then bonded the same kind of plate as mentioned above with an epoxy resin. The laminate is then measured for tensile shear strength. The break strength and site of break are as follows.

(1) The break strength of the plastic protective layer on the iron plate is 47.8 kg/cm$^2$ and the plastic protective layer is peeled off at the border of the epoxy resin with the iron plate.
(2) The break strength of the plastic protective layer on the aluminum plate is 42.7 kg/cm$^2$ and the plastic protective layer is peeled off at the border of the epoxy resin with the aluminum plate.
(3) The break strength of the plastic protective layer on the stainless steel plate is 47.2 kg/cm$^2$ and the plastic protective layer is peeled off at the border of the epoxy resin with the stainless steel plate.
(4) The break strength of the plastic protective layer on FRP is as high as 355 kg/cm$^2$ and the epoxy material itself breaks.

As can be seen in Tables 1 and 2, the polyurethane emulsions of Examples 1 to 5 each are a novel emulsion having not smaller than 2.05 functional groups incorporated in the polyol moiety of the resin component on the average, i.e., having crosslinkability, obtained by a novel production method. These inventive polyurethane emulsions can provide a plastic protective layer having properties which cannot be attained in Examples 6 to 8, i.e., extremely high hardness and film strength and excellent adhesion and resistance to water, particularly hot water, and alcohol.

Further, the polyurethane emulsion still exhibits extremely excellent physical properties when it comprises a pigment or thixotropic material incorporated therein as follows.

Polyurethane emulsions are synthesized in the same manner as in the production step of Examples 1 to 8, respectively, except that 2 parts by weight of a pigment (carbon black produced by Mikuni Color Ltd.) kneaded with DOP (dioctyl phthalate) is added to 100 parts by weight of polyol mixture which is the compound B1.

100 parts by weight of each of the polyurethane emulsions thus obtained are then mixed with 16 parts by weight of ultrafinely divided synthetic silica paste (Aerogel A3) as a thixotropic material to obtain thixotropic polyurethane emulsions PT-1 to PT-8. These thixotropic solutions are characterized in that they apparently stay gel or solid in static state but apparently look liquid under stress such as vibration.

In the present example, the ultrafinely divided synthetic silica paste used as thixotropic material is obtained by adding 40 parts by weight of an ultrafinely divided synthetic silica powder (Aerogel A3) to 100 parts by weight of water, and then kneading the mixture using a homogenizer. These polyurethane emulsions are set forth as Examples 1-T to 8-T in Table 2.

The polyurethane emulsions thus obtained are each put in a container 21 as shown in FIG. 3. The core pack 5 is then dipped in the polyurethane emulsion while the polyurethane emulsion is being given vibration to become liquid. In this manner, the polyurethane emulsion is spread over the surface of the primer-coated aluminum outer case to a thickness of from 70 to 90 μm. The core pack 5 is dried at room temperature for 12 hours, and then dried at 80° C. for 3 hours to form a plastic protective layer 1. The plastic protective layer 1 exhibits the following physical properties.

In this test, adhesion test is checkerboard tape peeling test according to JIS K5400. The measurements are represented, e.g., by "56/100", which means that 56 out of 100 checkers remained unpeeled while 44 out of 100 checkers were peeled. Accordingly, those showing no peeling are represented by 100/100 and those having all the checkers peeled are represented by 1/100.

The water resistance test consists of evaluation of external appearance of the plastic protective layer 1 which has been allowed to stand in water for 4 hours and then withdrawn from water and the aforementioned adhesion test. The hot water resistance test consists of evaluation of external appearance of the plastic protective layer 1 which has been allowed to stand in 60° C. hot water for 4 hours and then withdrawn from water and the aforementioned adhesion test. For the alcohol resistance test, a gauze coated with ethanol is folded in two. The plastic protective layer 1 is rubbed with the gauze 100 times under a load of 500 g, and then evaluated for external appearance. The results of measurement are set forth in Table 2.

Table 2 shows that the polyurethane emulsions comprising a thixotropic material incorporated therein exhibit extremely excellent physical properties. In other words, plastic protective layers excellent all in physical properties such as adhesion, water resistance, hot water resistance and alcohol resistance superior to that of the plastic protective layers of Examples 6 to 8.

Further, the plastic protective layer made of a polyurethane emulsion comprising a carbon black incorporated therein as a pigment can be irradiated with a laser beam to cause the sublimation or discoloration of the carbon black, making it possible to display letters, patterns, signs, etc. thereon as shown in FIG. 1. This battery pack can display the model name, production number, ratio, etc. of the product on the plastic protective layer in an extremely simple manner. This eliminates the necessity of attaching dedicated label to or printing data on the battery as in the conventional case, making it possible to reduce the production cost. Moreover,

TABLE 2

| Components and properties | 1-T | 2-T | 3-T | 4-T | 5-T | 6-T | 7-T | 8-T |
|---|---|---|---|---|---|---|---|---|
| IPDI (organic diisocyanate as compound A) (parts) | 100 | 100 | 100 | 100 | 100 | 100 | 100 | 100 |
| Polyol mixture as compound B1 (parts) | | | | | | | | |
| Polyol (1) | 126 | 88 | — | 75 | — | 166 | — | — |
| Polyol (2) | — | — | 113 | — | 94 | — | — | — |
| Polyol (3) | 8.3 | 12.4 | 16.5 | 33 | 25 | — | — | — |
| Polyol (4) | — | — | — | — | — | — | 166 | — |
| Polyol (5) | — | — | — | — | — | — | — | 166 |
| Pigment (parts) | 2.68 | 2.01 | 2.59 | 2.16 | 2.38 | 3.32 | 3.32 | 3.32 |
| DBTL as catalyst (parts) | 0.1 | 0.1 | 0.1 | 0.1 | 0.1 | 0.1 | 0.1 | 0.1 |
| Compound B2 | | | | | | | | |
| DMPA (parts) | 18 | 18 | 18 | 9 | — | 19.8 | 18 | 18 |
| DMBA | — | — | — | — | 9 | — | — | — |
| TEA as neutralizing agent (parts) | 18 | 13.5 | 13.5 | 9 | 9 | 19.8 | 18 | 18 |
| MEK as solvent (parts) | 250 | 250 | 36 | 45 | — | 500 | 500 | 500 |
| IPDA as chain extender (parts) | 15.3 | 15.3 | — | — | — | 25.8 | 25.8 | 25.8 |
| Water as dispersant (parts) | 496 | 398 | 445 | 393 | 356 | 600 | 600 | 600 |
| Ultrafinely divided synthetic silica paste (parts) | 122 | 101 | 111 | 98 | 94 | 130 | 130 | 130 |
| Polyurethane emulsion | PT-1 | PT-2 | PT-3 | PT-4 | PT-5 | PT-6 | PT-7 | PT-8 |
| Solid content (%) | 35.9 | 37.5 | 36.4 | 36.9 | 38.8 | 28.3 | 28.5 | 28.8 |
| Static viscosity (cps/25° C.) | gel | gel | gel | gel | gel | gel | gel | gel |
| Viscosity in use (cps/25° C.) | 6 | 8 | 5 | 9 | 8 | 3 | 5 | 20 |
| Adhesion test | 100/100 | 100/100 | 100/100 | 100/100 | 100/100 | — | — | — |
| Water resistance test | | | | | | | | |
| External appearance | Good | Good | Good | Good | Good | Blister | Blister | — |
| Adhesion test | 100/100 | 100/100 | 100/100 | 100/100 | 100/100 | 0/100 | 26/100 | — |
| Hot water resistance test | | | | | | | | |
| External appearance | Swell | Good | Good | Good | Good | Peeled | Peeled | Blister |
| Adhesion test | 88/100 | 92/100 | 100/100 | 100/100 | 100/100 | 0/100 | 0/100 | 4/100 |
| Alcohol resistance test | | | | | | | | |
| Rubbed once | Decolored | Good | Good | Good | Good | Dissolved | Decolored | Decolored |
| Rubbed 100 times | Swell | Decolored | Good | Good | Good | — | Swell Dissolved | Swell Dissolved | the invention is also advantageous in that since the discoloration of carbon black causes display, discoloration with time can be reduced, making it possible to display data over an extended period of time.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A battery pack comprising:
   a cell;
   a plastic protective layer bonded to the surface of the cell, the plastic protective layer being formed of a solidified polyurethane emulsion; and
   a holder assembly fixed to the end of the cell, the holder assembly comprising a first holder and a second holder fitted in the first holder; and
   a plurality of output terminals interposed between the first holder and the second holder so as to fix the output terminals in position;
   wherein the periphery of the holder is formed so as to follow the periphery of the cell,
   the polyurethane emulsion is coated over an outer peripheral surface of the cell and an outer peripheral surface of the holder such that the cell and the holder are connected to each other at their interface by the plastic protective layer coating,
   the holder assembly forms an attaching portion and a non-attaching portion, both of which are formed by the periphery of the holder assembly, and the cross-sectional area of the attaching portion is smaller than that of the non-attaching portion, and
   the plastic protective layer is coated on the attaching portion and not on the non-attaching portion, and the periphery of the holder assembly is substantially flush with the periphery of the cell.

2. The battery pack as described in claim 1, wherein the holder assembly is bonded and thus fixed to the cell.

3. The battery pack as described in claim 1, wherein the holder assembly is fixed to the cell with a rivet.

4. The battery pack as described in claim 1, wherein a protective element is interposed between the holder assembly and the cell.

5. The battery pack as described in claim 1, wherein the polyurethane emulsion has a pigment incorporated therein.

6. The battery pack as described in claim 5, wherein the pigment is a carbon black.

7. The battery pack as described in claim 6, wherein the polyurethane emulsion having a carbon black incorporated therein is irradiated with a laser beam to display letters, patterns, signs, etc.

8. The battery pack as described in claim 1, wherein the polyurethane emulsion has a thixotropic material incorporated therein.

9. The battery pack as described in claim 1, wherein the solidified polyurethane emulsion is formed of a reaction product derived from a first compound made of an organic diisocyanate, a second compound made of a polyol mixture having not smaller than at least 2.05 average functional groups and a third compound having one hydrophilic center and at least two active hydrogen groups in water.

10. The battery pack as described claim 9, wherein the second compound is a polyol mixture of a bifunctional polyol and a trifunctional or higher polyol.

11. The battery pack as described in claim 10, wherein the molecular weight of the trifunctional polyol is smaller than the molecular weight of the bifunctional polyol.

12. The battery pack as described claim 9, wherein the second compound is a polyol mixture of a bifunctional polyol and a trifunctional polyol the average number of functional groups of which is from 2.05 to 2.6.

13. The battery pack as described in claim 12, wherein the molecular weight of the trifunctional polyol is smaller than the molecular weight of the bifunctional polyol.

14. The battery pack as described in claim 9, wherein the third compound is either 2,2-dimethylolpropionic acid, and 2,2-dimethylolbutanoic acid.

* * * * *